United States Patent
Kisil et al.

(10) Patent No.: US 10,808,858 B2
(45) Date of Patent: Oct. 20, 2020

(54) HIGH SPEED VALVE

(71) Applicant: Automotive Technologies International, Inc., Tarrytown, NY (US)

(72) Inventors: Victor Kisil, Kyiv (UA); Vladymyr Pogrebinsky, Kiev (UA)

(73) Assignee: Automotive Technologies International, Inc., Tarrytown, NY (US)

( * ) Notice: Subject to any disclaimer, the term of this patent is extended or adjusted under 35 U.S.C. 154(b) by 64 days.

(21) Appl. No.: 16/162,658

(22) Filed: Oct. 17, 2018

(65) Prior Publication Data
US 2019/0113147 A1    Apr. 18, 2019

Related U.S. Application Data

(60) Provisional application No. 62/573,265, filed on Oct. 17, 2017.

(51) Int. Cl.
*F16K 31/06*  (2006.01)
*F16K 31/42*  (2006.01)
(Continued)

(52) U.S. Cl.
CPC ............ *F16K 31/0655* (2013.01); *F01L 9/02* (2013.01); *F16K 31/0627* (2013.01);
(Continued)

(58) Field of Classification Search
CPC ............. F16K 31/0627; F16K 31/0675; F16K 31/0679; F16K 31/082; F16K 31/084;
(Continued)

(56) References Cited

U.S. PATENT DOCUMENTS 2,799,466 A    7/1952  Hickerson
2,919,714 A    1/1960  Mrazek
(Continued)

FOREIGN PATENT DOCUMENTS

CN    201177092 Y    1/2009
CN    103670807 A    3/2014
(Continued)

OTHER PUBLICATIONS

Microsys Cold Gas Inflation System, Concept Tech GmbH, 2015.
(Continued)

*Primary Examiner* — Matthew W Jellett
(74) *Attorney, Agent, or Firm* — Brian Roffe

(57) ABSTRACT

Valve including a valve body having a drain hole, a valve seat including an outlet union from which fluid flows out of the valve, a cup coupled to the valve body and biased against the valve seat, an input union, and a control valve arranged partly inside the valve seat. The control valve defines a compartment and includes an actuator, a permanent magnet and first and second electromagnets. The actuator includes a slide arranged in the compartment and that closes the drain hole when in a first position and is spaced apart from the drain hole when in a second position, and an armature. Providing current to the first electromagnet causes the slide to move to the second position separated from the drain hole and causes movement of the cup apart from the valve seat and thus flow of fluid from the input union to the outlet union.

22 Claims, 5 Drawing Sheets

(51) Int. Cl.
  *F16K 31/08*   (2006.01)
  *F01L 9/02*    (2006.01)
  *F16K 31/40*   (2006.01)
  *F02M 59/36*   (2006.01)
  *F02M 59/46*   (2006.01)
  *B05C 5/02*    (2006.01)

(52) U.S. Cl.
  CPC ...... *F16K 31/0675* (2013.01); *F16K 31/0679* (2013.01); *F16K 31/082* (2013.01); *F16K 31/084* (2013.01); *F16K 31/40* (2013.01); *F16K 31/42* (2013.01); *F16K 31/423* (2013.01); *F16K 31/426* (2013.01); *B05C 5/0225* (2013.01); *F02M 59/366* (2013.01); *F02M 59/466* (2013.01)

(58) Field of Classification Search
  CPC ........ F16K 31/40; F16K 31/42; F16K 31/423; F16K 31/426; F02M 59/366; F02M 59/367; F02M 59/466; B05C 5/0225
  USPC .......................... 251/30.01, 30.02, 30.05, 65
  See application file for complete search history.

(56) References Cited

U.S. PATENT DOCUMENTS

| | | | |
|---|---|---|---|
| 2,921,466 A | 1/1960 | Nerwin, Jr. | |
| 3,372,899 A | 3/1968 | McPherson | |
| 3,379,406 A | 4/1968 | Greer | |
| 3,380,469 A * | 4/1968 | Salerno | F16K 31/42 137/219 |
| 3,439,895 A | 4/1969 | Marandi | |
| 3,533,434 A | 10/1970 | Smith | |
| 3,540,462 A | 11/1970 | Renzi | |
| 3,792,217 A | 2/1974 | McConnell et al. | |
| 3,814,884 A | 6/1974 | McConnell | |
| 3,816,682 A | 6/1974 | MacBeth | |
| 3,816,683 A | 6/1974 | Mockli | |
| 3,942,485 A | 3/1976 | Suda et al. | |
| 3,981,479 A | 9/1976 | Foster et al. | |
| 4,004,258 A | 1/1977 | Arnold | |
| 4,073,464 A | 2/1978 | Hansen et al. | |
| 4,076,046 A | 2/1978 | Hieronymus et al. | |
| 4,082,148 A | 4/1978 | Willms | |
| 4,099,701 A | 7/1978 | Berga | |
| 4,114,648 A | 9/1978 | Nakajima | |
| 4,187,764 A | 2/1980 | Cho | |
| 4,194,694 A | 3/1980 | Hickerson | |
| 4,197,873 A | 4/1980 | Bennett et al. | |
| 4,201,362 A | 5/1980 | Nishimi et al. | |
| 4,256,133 A * | 3/1981 | Coward | A01G 25/16 137/624.11 |
| 4,325,347 A | 4/1982 | Yamaguchi | |
| 4,533,890 A | 8/1985 | Patel | |
| 4,651,768 A | 3/1987 | Epe | |
| 4,671,485 A | 6/1987 | Saarem | |
| 4,690,371 A | 9/1987 | Bosley et al. | |
| 4,925,153 A | 5/1990 | Roemer | |
| 4,967,996 A | 11/1990 | Sonoda et al. | |
| 4,974,495 A * | 12/1990 | Richeson, Jr. | F01L 9/02 91/459 |
| 5,178,359 A * | 1/1993 | Stobbs | B60T 8/367 137/454.5 |
| 5,450,839 A | 9/1995 | Nicolaevich et al. | |
| 5,941,502 A * | 8/1999 | Cooper | F16K 27/0281 251/129.15 |
| 5,947,514 A | 9/1999 | Keller et al. | |
| 6,029,720 A | 2/2000 | Swinford | |
| 6,039,072 A | 3/2000 | Messick et al. | |
| 6,068,288 A | 5/2000 | Karolek et al. | |
| 6,158,713 A | 12/2000 | Ohya et al. | |
| 6,170,524 B1 | 1/2001 | Gray, Jr. | |
| 6,193,212 B1 | 2/2001 | Ohmi et al. | |
| 6,231,077 B1 | 5/2001 | Karolek et al. | |
| 6,334,413 B1 | 1/2002 | Hattori et al. | |
| 6,394,415 B1 | 5/2002 | Ohmi et al. | |
| 6,763,789 B1 | 7/2004 | Liang et al. | |
| 6,955,331 B2 | 10/2005 | Larsen et al. | |
| 7,641,171 B2 | 1/2010 | Chinda | |
| 8,225,813 B2 * | 7/2012 | Evanno | F02C 6/08 137/468 |
| 8,366,026 B2 | 2/2013 | Wang et al. | |
| 8,576,032 B2 * | 11/2013 | Herbert | F16K 7/16 251/129.15 |
| 8,833,732 B2 | 9/2014 | Heiko et al. | |
| 9,435,449 B2 | 9/2016 | Shelly | |
| 9,890,871 B2 | 2/2018 | Liang et al. | |
| 10,047,872 B2 | 8/2018 | Shelly | |
| 10,060,546 B2 | 8/2018 | Tuskes | |
| 10,428,770 B2 | 10/2019 | Kim | |
| 2004/0169359 A1 | 9/2004 | Isakov et al. | |
| 2011/0042597 A1 | 2/2011 | Huculak | |
| 2011/0100487 A1* | 5/2011 | Chen | F16K 31/40 137/487.5 |
| 2017/0074418 A1 | 3/2017 | Liang et al. | |
| 2019/0189322 A1 | 6/2019 | Wygnanski et al. | |
| 2019/0346057 A1 | 11/2019 | Verrecchia et al. | |
| 2020/0003331 A1 | 1/2020 | Beck | |
| 2020/0020472 A1 | 1/2020 | Edrington et al. | |
| 2020/0041023 A1 | 2/2020 | Goers et al. | |
| 2020/0063876 A1 | 2/2020 | Desalvo et al. | |
| 2020/0072377 A1 | 3/2020 | Itoh | |

FOREIGN PATENT DOCUMENTS

| | | |
|---|---|---|
| CN | 104036915 A | 9/2014 |
| DE | 19836516 A1 | 2/1999 |
| EP | 1156247 A2 | 11/2001 |
| EP | 2206940 B1 | 7/2010 |
| EP | 3330584 A1 | 6/2018 |
| WO | 2006096092 A1 | 9/2006 |

OTHER PUBLICATIONS

Written Opinion issued for International Application No. PCT/US2018/056252 dated Feb. 5, 2019.
International Search Report issued for International Application No. PCT/US2018/056252 dated Feb. 5, 2019.
Abstract of DE 19836516.
Abstract of CN 103670807.
Abstract of CN 104036915.

* cited by examiner

FIG. 1
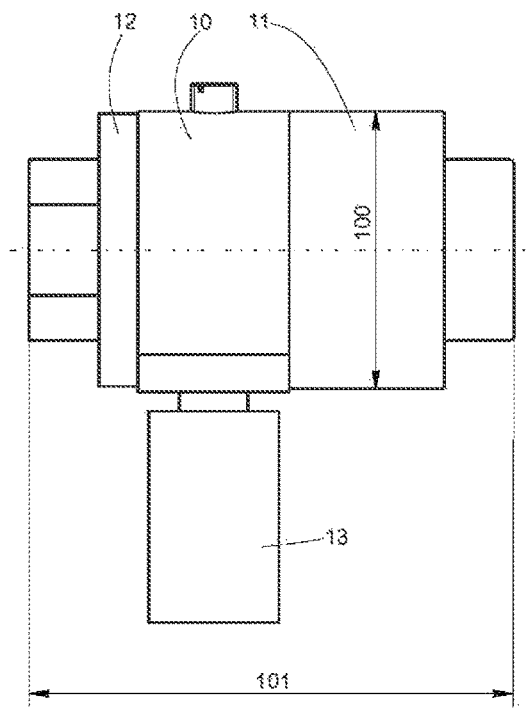
FIG. 2
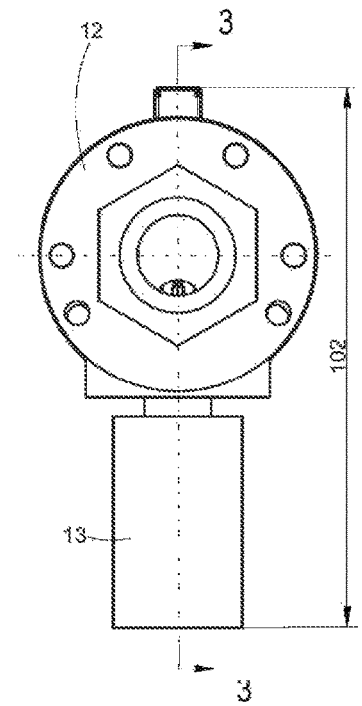
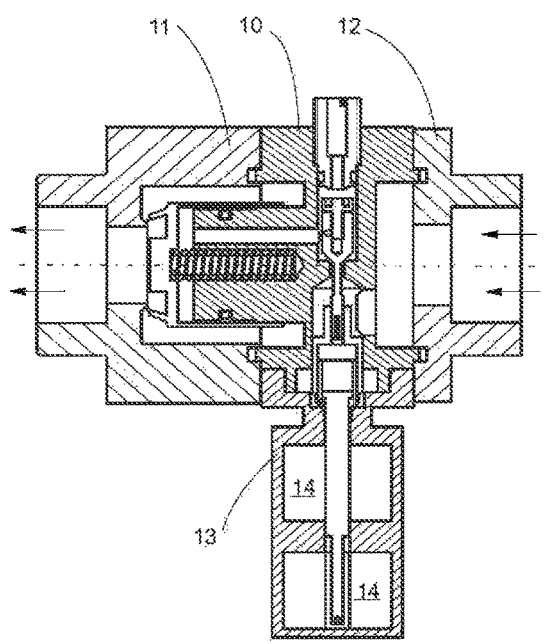
FIG. 3

HIGH SPEED VALVE

CROSS-REFERENCE TO RELATED APPLICATION

This application claims priority of U.S. provisional patent application Ser. No. 62/573,265 filed Oct. 17, 2017, now expired, which is incorporated by reference herein.

FIELD OF THE INVENTION

This invention pertains to fluid control devices in general, and particularly, to constructions of a fast-acting, electromagnetic solenoid valve.

BACKGROUND OF THE INVENTION

Traditional fluid valves usually operate by moving solid objects to obstruct a flow path of the fluid. Electric magnets or electromagnets may be used as actuators for alternatingly moving a valve into open and closed positions or between such positions. Some constructions are known as two magnet electromagnetic valves. UHSV will be used herein as an abbreviation of a Universal High-Speed Valve.

Prior art pneumatically actuated valves have different opening and closing times, which is disadvantageous.

SUMMARY OF THE INVENTION

One embodiment of the present invention is an electromagnetic actuated valve which can be opened and closed within the same time duration and will remain open for a duration of 2 to 50 ms or more. The electromagnetic valve may include two solenoids and permanent magnets and can eliminate the inequality arising from the different opening and closing times of the valve as exists in prior art pneumatically actuated valves.

Prior art pneumatically controlled valves typically provide a closing time about 3 times longer than the opening time and both times generally are much longer than a valve in accordance with the invention. This makes it difficult to precisely control the volume of fluid, usually gas, flowing through the valve especially when the supply pressure varies. The opening and closing times of pneumatic valves are usually a function of the supply pressure. Using two magnets as in the invention provides the opportunity to make the duration of both valve opening and closing operations equal. This is important when the fluid volume which goes through the valve at one shot must be accurately controlled. For example, for airbag deployment testing, a controlled volume of about 15 to about 150 STP liters must flow through the valve in approximately 30 milliseconds. This can be accomplished using the high speed valve of this invention and the gas supply can vary from about 10 to about 70 bars or more, depending on the particular valve design, without affecting the valve opening or closing time. Furthermore, electromagnetic valves do not need an additional fluid or air supply for operation as in the case of pneumatically operated valves.

The valves of this invention are suitable for use in, for example, airbag design testing systems, line throwers, shakers for releasing clogged bulk materials in the bunkers, etc., but is not limited to such uses As a result of a valve designed in accordance with the invention, it becomes possible to provide a fast opening time in the range of about 2 ms to about 4 ms, and provide equality between valve opening and closing times.

More specifically, a valve in one embodiment includes a valve housing including an input portion through which fluid flows into the valve housing, a valve seat including an outlet portion through which fluid flows out of the valve housing, at least one relief channel, and a drain hole. A cup is biased against the valve seat and arranged in the valve housing to define a first cavity inside the cup in flow communication with the relief channel(s) and a second cavity adjacent and external of the cup. A third cavity is defined by the input portion, the valve housing including at least one supply channel between the second and third cavities. A control valve is arranged partly inside the valve housing, defines a compartment and includes an actuator, a permanent magnet and first and second electromagnets. The compartment is in flow communication with the relief channel(s). The actuator includes a slide arranged in the compartment and that closes the drain hole when in a first position and is spaced apart from the drain hole when in a second position, and an armature.

The valve has a closed position in which the armature is held in a position by the permanent magnet while the slide is in the first position closing the drain hole and preventing fluid flow from the first cavity through the relief channel(s) into the compartment and then into the drain hole. The cup is biased against the valve seat preventing fluid in the second and third cavities from flowing out of the outlet portion.

The valve has a open position in which current is provided to the first electromagnet to cause the actuator to move the slide to the second position separated from the drain hole and allowing fluid flow from the first cavity through the relief channel(s) into the compartment and then into the drain hole causing pressure in the second cavity to be greater than pressure in the first cavity and resulting in movement of the cup apart from the valve seat and thus flow of fluid from the second cavity through a gap between the cup and the valve seat to the outlet portion.

A control housing may be coupled to the valve housing and the control valve is arranged partly inside the control housing. The control housing is configured to enable the armature to move within the control housing without springs.

When the valve is in the open position, the valve can return to the closed position by providing current to the second electromagnet to cause the slide to move to the first position closing the drain hole and preventing fluid flow from the first cavity through the channel into the compartment and then into the drain hole causing pressure in the second cavity to become equal to pressure in the first cavity and thereby resulting in movement of the cup against the valve seat and thus preventing flow of fluid from the second cavity to the outlet union.

BRIEF DESCRIPTION OF THE DRAWINGS

The following drawings are illustrative of embodiments of the system developed or adapted using the teachings of at least one of the inventions disclosed herein and are not meant to limit the scope of the invention as encompassed by the claims.

FIG. 1 is a side view of an assembled high speed valve in accordance with the invention.

FIG. 2 is a front view of the valve in accordance with the invention.

FIG. 3 shows a cross sectional view of the valve taken along the line 3-3 in FIG. 2.

DETAILED DESCRIPTION OF PREFERRED EMBODIMENTS

In the foregoing explanation of a high speed valve in accordance with the invention, it is expected that the valve operating pressure will typically be in a range from about 10 to about 70 bar, although the operating pressure does not limit the scope of the claims. Such relatively high pressures can lead to special requirements for the valve parts and the materials of the valve parts. For example, the basic valve parts are preferably at least partly or possibly entirely made from stainless steel 431 (14×17H2 designated by EU producers), the main spool seals are preferably made from fluoroplastic and the other seals are preferably rubber rings. In one embodiment, the valve seat, the cup and the internal slide comprise any composition of stainless steel, i.e., they may be made partly or entirely of stainless steel.

Figure 4:
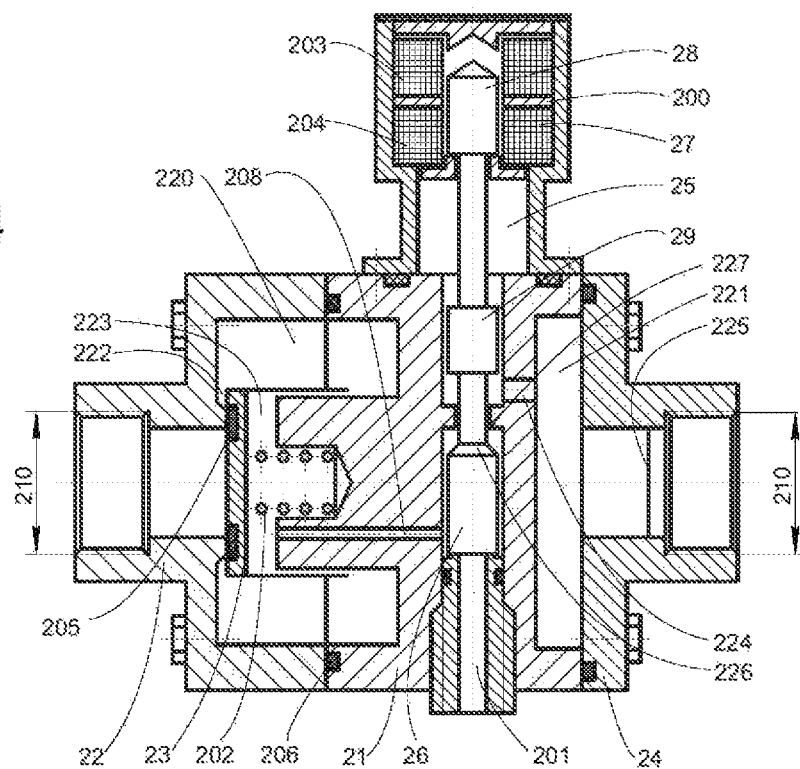
FIG. 4 is a side cross-sectional view of the high-speed valve, in which the valve is shown in the normally closed condition.
Figure 5:
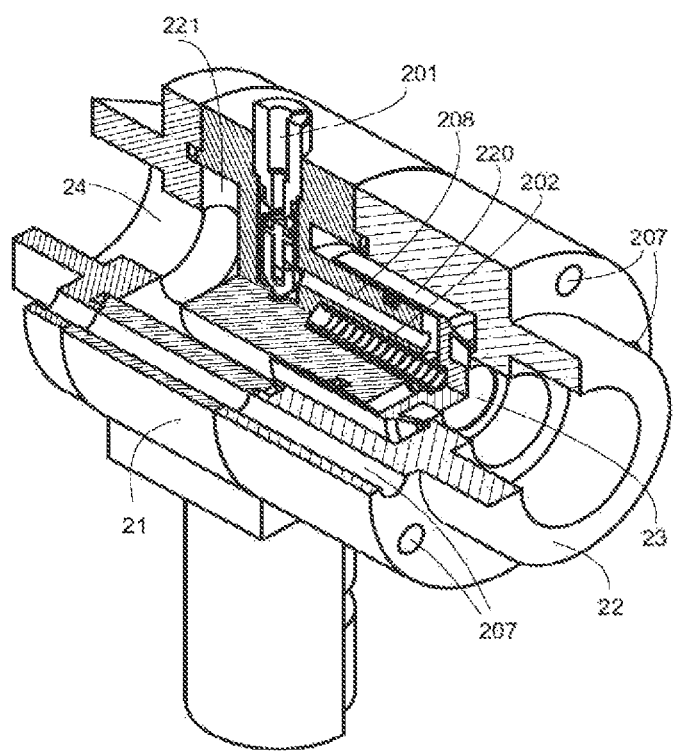
FIG. 5 is a valve cross-section in axonometric view.

A high speed valve in accordance with this invention preferably has following features (it may have only one of these features, all of the features or any variation of features):

All valve parts except the seals are made partly or entirely of stainless steel including an internal slide 26, a main valve cup 23 and a valve seat 22 (FIGS. 4 and 5). Instead of stainless steel, another material or combination of materials that has the same properties as stainless steel as they relate to the disclosure herein in order to achieve the objectives of the valve disclosed herein may be used. Stainless steel however is the preferred material, and encompasses any material that is considered by those skilled in the art to be referred to as stainless steel.

A solenoid armature unit or armature 28 moves in a solenoid block through a gap without springs;

The absence of a spring in a pilot control block 25 leads to the decrease of the valve response time;

Two or more solenoids or coils 203 and 204 preferably have a small number of windings which leads to lower inductance and thus a decrease of the time constant (a small number is not indefinite but will be understood by those skilled in the art to which this invention pertains to mean a number that is less than what is used in conventional apparatus of a similar type, for example, as discussed above);

No control pressure supply is needed;

Equality is achieved between valve opening and closing times.

Figure 6:
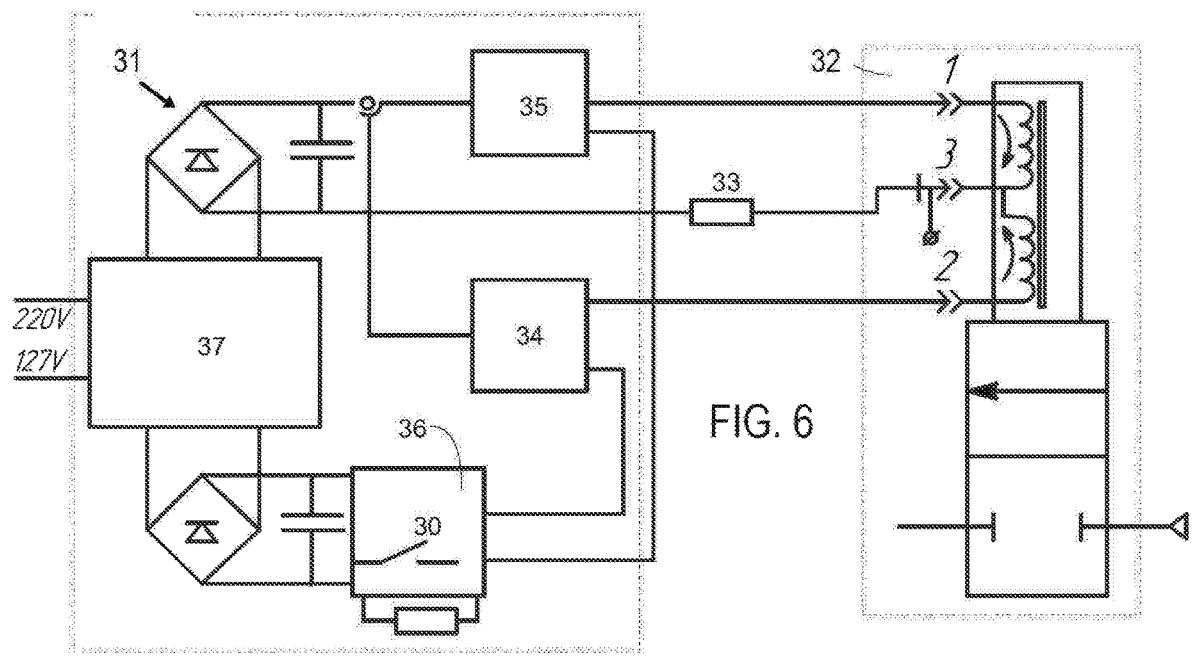
FIG. 6 shows a function diagram of the circuit of the high-speed valve control unit.

A more complicated control unit is needed as shown in FIG. 6.

This high-speed valve design provides, in one exemplifying embodiment, the following time characteristics: the valve opening time is about 2 to about 4 ms, the valve closing time is about 3 to about 5 ms, the opening time lag is about 12 ms, and the closing time lag is about 20 ms. The valve opening/closing time is the time of the main valve cup 23 to travel from one position to the other. The opening/closing time lag is the time between the leading edge of respective signal and the beginning of valve cup movement. It occurs due to finite time for the voltage to rise in the solenoids, the control slide travel time and pressure change time in control valve cavity.

Referring now to FIGS. 1-3, an exemplifying embodiment of the valve assembly has the following representative overall dimensions: diameter 100 is about 79 mm, valve length 101 is about 125 mm, and valve height 103 is about 141 mm. These dimensions are not limiting and the valve assembly may of course have other dimensions.

FIG. 3 shows a cross sectional view of the high speed valve where basic valve elements are shown as a first or main body part 10, a second body part 11 called an outlet union, a third body part 12 called an inlet or input union and a solenoid block 13 with two solenoids 14 (as an example of a plurality of solenoids). The first body part 10 is between the second and third body parts 11, 12 and coupled thereto. Solenoid block 13 is also referred to as a control housing. The combination of the main body part 10, the outlet union 11 and the input union 12 may be considered a valve housing. A valve housing does not require three separate parts as disclosed and other constructions of the valve housing with the relevant features disclosed herein may be used in the invention, e.g., a unitary valve body that has an inlet portion as the input union and an outlet portion as the outlet union.

The direction of gas flow is shown by arrows in FIG. 3.

FIG. 4 shows schematically the valve design in which the valve is shown in a normally closed position. The valve comprises the following main parts: a valve body 21 (comparable to the main body part 10), the valve seat 22 with outlet union (comparable to outlet union 11), the cup 23, an input union 24 (comparable to input union 12), and a pilot control valve 25. The pilot control valve 25 is located partly inside the high-speed valve body 21 and comprises the internal slide 26 and two solenoid electromagnets 27. Armature 28, internal slide 26, and a rod and buffer unit 29 are preferably formed integrally with one another, and whether integral with one another or otherwise connected together, may be considered to constitute an actuator as used herein. In one embodiment, the armature 28, the slide 26 and the rod and buffer unit 29 are integral with one another, whether formed that way or otherwise, which may be considered that there is a unit that consists of or is composed of these parts that together constitute a whole component or system.

The pilot valve 25, the valve seat 22 and input union 24 are bolted to the valve body 21 through passages 207 (see FIG. 5, with the ends of the bolts being visible in FIG. 4). Instead of bolting, other attachment techniques may be used provided they provide a secure attachment in a similar manner as bolting or in a different manner but which provides a strong bond between the attached parts. Such attachment structure is referred to herein as attachment means for attaching the pilot valve 25, the valve seat 22 and the input union 24 to the valve body 21.

Mating surfaces are sealed with rings 206 that are preferably made partly or entirely of rubber, e.g., between the valve body 21 and the valve seat 22 and between the valve body 21 and the input union 24. Instead of rings 206, other interposing structure or techniques that seal an interface between the valve seat 22 and the valve body 21 may be used in the invention and may be referred to as sealing means herein.

Cup 23 has a seal 205 on its face adjacent to the valve seat 22, which seal 205 is preferably made partly or entirely of plastic and is configured to seal against part of the valve seat 22. Inflow and outflow channels pipe thread 210 is preferably G⅞". One or more seals are also provided between the control housing and the valve body (FIG. 4). Seal 205 may thus be considered to be arranged on the cup 23 and configured to be pressed against the valve seat 22 when the cup 23 is pressed toward and against the valve seat 22. Instead of seal 205, other interposing structure or techniques that seal against the valve seat 22 may be used in the invention and may be referred to as cup sealing means herein.

Chambers or cavities 220 and 221 are connected by one or more supply channels 46 (FIGS. 9 and 10), and their area must be larger than area of the narrowest valve channel 225 in order to avoid additional pressure losses. Cavity 220 is defined in part by the valve body 21 and the valve seat 22. Cavity 221 is defined in part by the valve body 21 and the input union 24 (FIG. 4).

In the closed position, the cup 23 is located at seat 22 (against seat 22) and closes the main gas flow passage. Armature 28 is at the bottom position and is held in this position by the magnetic force of a permanent magnet 200 in a housing of the pilot control valve 25 (like solenoid block 13 in FIGS. 1-3). The slide 26 closes a drain hole 201 of a drain component by moving the rod and buffer unit 29. One purpose of buffer unit 29 is to eliminate fluid flow from channel 224 to internal area of control valve 25, or at least hinder such fluid flow with elimination being a preferred situation. Drain component with the drain hole 201 is arranged in a recess in the valve body 21 and seal rings may be provided to seal the drain component against the inner surfaces defining the recess in the valve body 21 (FIG. 4). Drain component allows for the exhaust of air or other control fluid during the control process.

In an initial valve state (valve is closed), high pressure fluid is supplied to input union 24 filling cavities 220 and 221 and an internal space of the cup 23 through the channel 224 between the cavity 221 and a recess in the valve body 21 in which the slide 26 moves, a portion of the recess in which the slide 26 moves and a relief channel 208 in the valve body 21 that is in flow communication with this recess (FIGS. 4 and 5). As a result, the pressure in an area or chamber 220, 222 (externally outside and adjacent cup 23) is equal to the pressure of cavity 223 inside the cup 23. Relief channel 208 is a conduit between the cavity 223 which is in flow communication with or formed in the internal space of the cup 23 and leads to a compartment or recess defined in the valve body 21 in which the slide 26 moves. In this compartment, the internal slide 26 is situated and rests on the upper edge of a drain component which defines the drain hole 201. There may be one relief channel 208 as shown, or more than one relief channel.

The pressure force and the spring 202 press the cup 23 toward and against the seat 22. In this position of the cup 23 and seat 22, the internal channel of the valve is sealed. The pressure force also presses the slide 26 to the seat of the drain hole 201.

For opening of the valve, the upper coil 203 is fed a current pulse by the control system (not shown in FIGS. 4 and 5). The manner in which the current pulse is provided by the control system and received by the upper coil 203 is known to those skilled in the art of electromagnetic valves. As a result of this current pulse, armature 28 moves up and stops at or near the upper limit stop formed in the housing of the control valve 25. Slide 26 moves up together with the armature 28, and blocks fluid access into the internal cavity of the cup 23 (fluid access is blocked when a conical surface 226 of the slide 26 is against orifice 227) and opens the drain hole 201 providing an outlet for fluid to exit out of the inside or internal cavity 223 of the cup 23. The pressure in cavity 220 becomes larger than the pressure inside the cup 23 (i.e., the pressure in chamber 222 becomes larger than the pressure in chamber or cavity 223). Thus, the higher pressure in cavity 220 moves the cup 23 to the right opening the valve channel. High pressure fluid such as air flows through the open cup 23 to valve outflow channel.

Valve closing is performed by applying a pulse of current from the control system to the lower coil 204. Again, the manner in which the current pulse is provided by the control system and received by the lower coil 204 is known to those skilled in the art of electromagnetic valves. The armature 28 goes down and returns to its initial position. The pressure in chambers 220 and 221 becomes equal. Spring 202 returns cup 23 to its initial position and closes the valve.

Valve seals are shown in two locations: seal 205 is between the cup 23 and the valve seat 22 and seal 206 is between the seat 22 and the valve body 21.

A functional diagram of the high speed valve control unit is shown in FIG. 6 and comprises the following: an electronic control unit 31, a high-speed valve 32, transistors 34 and 35 which are operated by a driver or generator 36, a transformer 37 and a current control resistance 33 in the coil windings.

Figure 7:
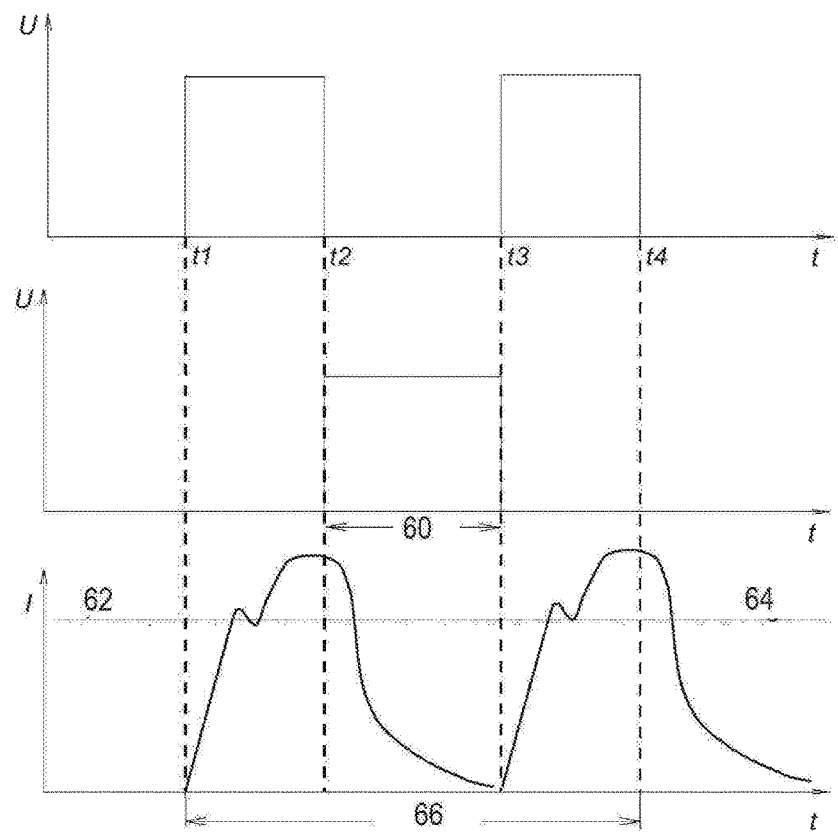
FIG. 7 illustrates UHSV valve control signals plots.

As for an example of control circuit operation: after the switch 30 is closed, the generator 36 generates control pulses in the sequence shown in FIG. 7. The time $t_1$ corresponds to closing of the switch 30 of the generator 36 (open current 62). This generator 36 generates a positive pulse of duration $(t_2-t_1)$ for opening of the transistor 34 by the current which goes through the inductance 2-3 (FIG. 6). The trailing edge of the pulse $(t_2-t_1)$ generates a timer pulse $t_{var}$ (60) in the end of $t_2$ and simultaneously closes the transistor 34 (closing current 64). The UHSV has an embedded permanent magnet (element 200 in FIG. 4) which, after transistor 34 closes and the absence of current in the coil 2-3 (FIG. 6), keeps the valve open, which leads the compressed fluid flow to the open line. The pulse duration is set by turning $t_{var}$ (60) of variable resistance in the driver (generator) unit. Trailing edge $t_{var}$ (60) generates pulse duration $(t_4-t_3)$, which opens the transistor 35 and connects a current pulse in the coil (positions 1-3 in FIG. 6) which closes the valve. Pulse trailing edge $(t_4-t_3)$ turns off the electromagnet while valve is held closed by the permanent magnet 200 embedded into the valve construction. T cycle (66) is the pulse duration $t_4-t_1$.

Figure 12:
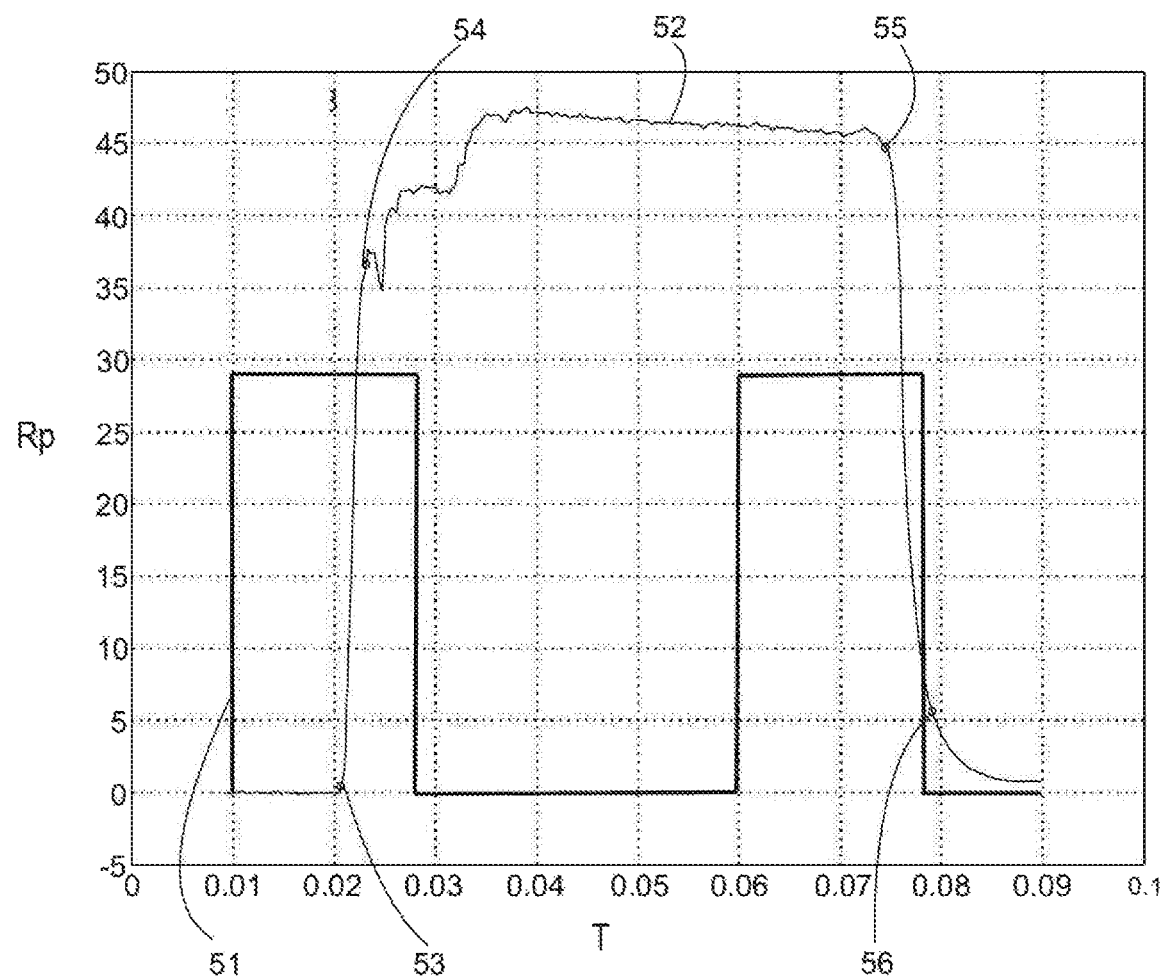
FIG. 12 shows pressure values at the valve outlet port

Experimental data in the form of pressure vs. time plot is depicted in FIG. 12 as line 52. Bold line 51 represents two control signals for valve opening and closing. Opening time is the time between points 53 and 54 whereas the closing duration is the time between points 55 and 56. Shape of plot 52 part after point 56 depends on the type of device connected to the valve outlet port. The maximum pressure is 46.98 bar. The vertical scale is reference pressure Rp in bars while the horizontal scale is time T in seconds.

The fast acting nature of the valve is based on the following features: the low number of coil windings, the constant magnetic location between coils and high capacitance of the capacitors (capacitors are not shown in FIG. 6 but one skilled in the art would recognize that they are present and the manner in which they function and are integrated into the circuit diagram).

The magnetic circuit of the valve has two coils. They create an attractive magnetic field once direct current flows through them that results in movement of the valve armature (position 26 in FIG. 4). A special feature of the magnetic circuit is that it includes the permanent magnet 200 that fixes the armature 28 (slide) after the high-pressure pipeline is opened. The force holding the armature 28 (slide) in place is sufficient for the valve to be de-energized.

This feature is an important consideration during development of the remote control circuitry. The circuitry provides both coils with short normalized electric pulses. This allows setting the armature 28 in a stable opened or closed position and de-energizing the coils immediately thereafter. It is possible to configure the delay between the trailing edge of the first impulse, which opens the flow path or pipeline and the front edge of the second impulse, which closes it. This delay allows control the amount of a gas that passes through the valve.

If the operational mode is autonomous, it is possible to control the valve either from the main unit or from an additional wired remote control.

The opening or closing of the main high-pressure pipeline of the valve can be performed either manually or automatically. It is also possible to open and close the pipeline from an additional remote control by, for example, pressing OPEN and CLOSE buttons manually controlling the valve open time.

Manual operation is reasonable during troubleshooting or configuring the facility.

Automatic operation allows the operator to set the pulse intervals more precisely using the 8-bit microcontroller ATtiny13A. The intervals are controlled by an internal timer (e.g., base frequency is about $4 \times 10^6$ Hz) and are programmable.

Figure 8:
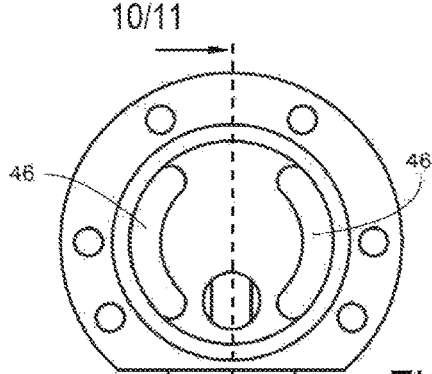
FIG. 8 is a front view of the valve body part.
Figure 11:
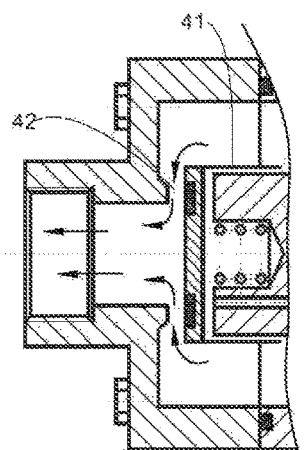
FIGS. 10 and 11 show the valve in closed and open positions, respectively, where flow of the gas is marked by arrows, and taken along the line 10/11-10/11 in FIG. 8.
Figure 9:
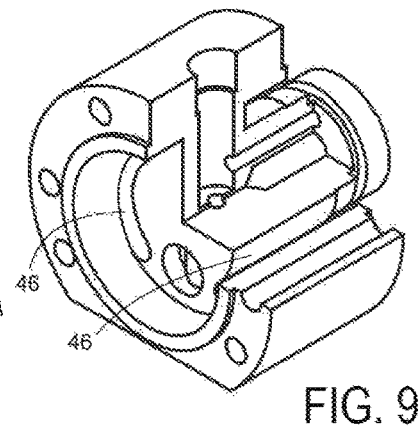
FIG. 9 is an axonometric view partly broken away.
Figure 10:
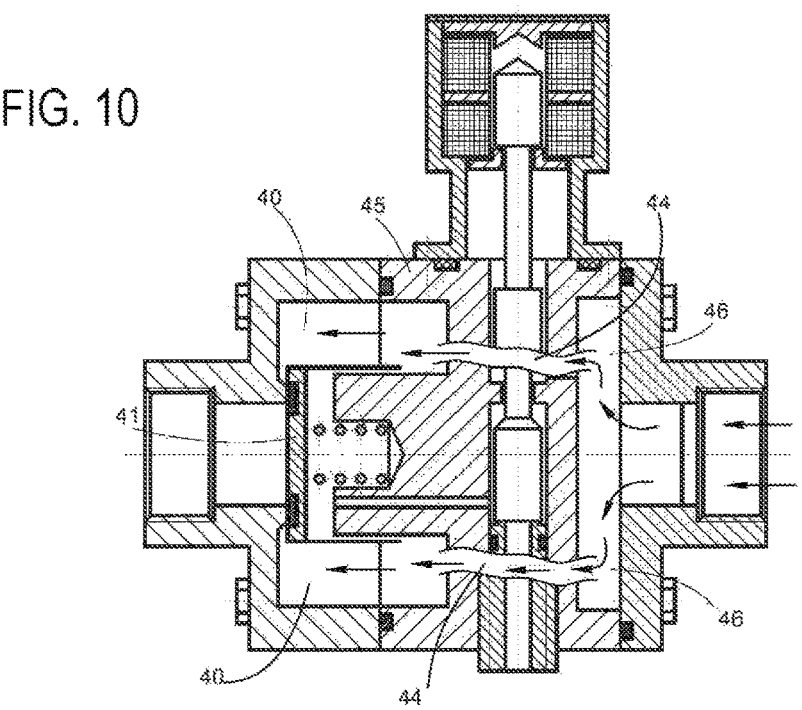

FIGS. 10 and 11 show gas flow direction by arrows. In FIG. 10, a high speed valve is shown in a closed position: cup 41 (element 23 in FIG. 4) is in the left position and touches the valve body. Pressurized gas filled chamber 40 has no outlet. To fill chamber 40, gas must flow through supply channels 46. The gas flow through supply channels 46 is shown at local cross sections 44 in FIG. 10. The internal and independent supply channels 46 are shown in FIGS. 8 and 9.

FIG. 11 shows the valve in open position where the cup 41 moves to the right position and gas flows out of the valve through a gap 42 between the forward surface of the cup 42 and the valve seat.

The invention can be implemented in numerous ways, including potentially as a fluid flow control process; an apparatus or a system. In this specification, these implementations, or any other form that the invention may take, may be referred to as fluid flow control techniques.

Although several preferred embodiments are illustrated and described above, there are possible combinations using other geometries, materials and different dimensions for the components that perform the same functions. At least one of the inventions disclosed herein is not limited to the above embodiments and should be determined by the following claims. There are also numerous additional applications in addition to those described above. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

The invention claimed is:

1. A valve, comprising:
   a valve housing including an input portion through which fluid flows into said valve housing, a valve seat including an outlet portion through which fluid flows out of said valve housing, at least one relief channel, and a drain hole;
   a cup biased against said valve seat and arranged in said valve housing to define a first cavity inside said cup in flow communication with said at least one relief channel and a second cavity adjacent and external of said cup, a third cavity being defined by said input portion, said cup being biased against said valve seat to prevent, when biased, fluid in said second and third cavities from flowing out of said outlet portion, said valve housing including at least one supply channel between said second cavity and said third cavity; and
   a control valve arranged partly inside said valve housing, said control valve defining a compartment and including an actuator, a permanent magnet, a first electromagnet on a first side of said permanent magnet and a second electromagnet on a second side of said permanent magnet opposite the first side of said permanent magnet, said drain hole being closer to the second side of said permanent magnet, said first and second electromagnets being configured such that current is provided to said first electromagnet without being provided to said second electromagnet and is provided to said second electromagnet without being provided to said first electromagnet,
   said compartment being in flow communication with said at least one relief channel and in flow communication with said third cavity through an additional supply channel,
   said actuator being partly arranged in said compartment and, when in a first position, closing said drain hole, permitting flow of fluid from said third cavity through said compartment to said at least one relief channel to said first cavity and preventing fluid flow from said compartment into said drain hole, and when in a second position, being spaced apart from said drain hole permitting flow of fluid from said compartment into said drain hole and obstructing flow of fluid from said third cavity through said compartment to said at least one relief channel and thus to said first cavity.

2. The valve of claim 1, wherein said actuator comprises a slide partly arranged in said compartment and that closes said drain hole when said actuator is in the first position and is spaced apart from said drain hole when said actuator is in the second position, and an armature partly arranged in a space defined by said permanent magnet, said first electromagnet and said second electromagnet.

3. The valve of claim 1, further comprising a control housing coupled to said valve housing, said control valve being arranged partly inside said control housing, said second electromagnet being arranged closer to said valve housing than said first electromagnet.

4. The valve of claim 3, wherein said actuator comprises a slide partly arranged in said compartment and that closes said drain hole when said actuator is in the first position and is spaced apart from said drain hole when said actuator is in the second position, and an armature partly arranged in a space defined by said permanent magnet, said first electromagnet and said second electromagnet, and wherein said control housing is configured to enable said armature to move within said control housing without springs.

5. The valve of claim 1, wherein said valve seat, said cup and said slide comprise stainless steel.

6. The valve of claim 2, wherein
said armature of said actuator is held in a position by said permanent magnet while said actuator is in the first position, and
wherein the valve is configured to move in a direction from a closed position toward an open position by providing current to said first electromagnet and not to said second electromagnet to cause said slide of said actuator to move away from said drain hole, and
wherein the valve is configured to move in a direction from the open position toward the closed position by providing current to said second electromagnet and not to said first electromagnet to cause said slide of said actuator to move toward said drain hole.

7. The valve of claim 2, wherein said actuator further comprises a rod and buffer unit interposed between said armature and said slide, said armature, said slide and said rod and buffer unit being integral with one another.

8. The valve of claim 1, wherein said valve housing comprises a valve body and an input union, further comprising attachment means for attaching said control valve, said valve seat and said input union to said valve body.

9. The valve of claim 1, further comprising at least one ring interposed between said valve seat and said valve housing to seal an interface between said valve seat and said valve housing.

10. The valve of claim 1, further comprising a seal arranged on said cup and configured to be situated against said valve seat when said cup is against said valve seat.

11. The valve of claim 1, wherein said valve housing comprises an input union providing said input portion, further comprising at least one ring interposed between said input union and said valve housing to seal an interface between said input union and said valve housing.

12. The valve of claim 1, wherein said at least one supply channel comprises a plurality of independent supply channels.

13. The valve of claim 1, wherein said first and third cavities are configured to have a larger area than an area of a narrowest one of said at least one supply channel.

14. The valve of claim 1, wherein said actuator is elongate and comprises at a first end, a slide that closes said drain hole when said actuator is in the first position and is spaced apart from said drain hole when said actuator is in the second position, an armature arranged at least partly in a space defined by said permanent magnet, said first electromagnet and said second electromagnet at a second end opposite the first end, and a rod and buffer unit interposed between said slide and said armature, and
wherein said valve housing defines an orifice through which said actuator extends with said slide and said drain hole being on a first side of said orifice and said armature being on an opposite, second side of said orifice, said orifice constituting a barrier to movement of said slide in a direction away from said drain hole, said compartment being in flow communication with said third cavity at a location on the second side of said orifice, said compartment being in flow communication with said at least one relief channel at a location on the first side of said orifice, and
wherein said slide is movable against said orifice when said actuator moves to the second position to form an obstruction to flow of fluid from said third cavity through said compartment to said at least one relief channel.

15. A valve, comprising:
a valve body including at least one relief channel and a drain hole;
an outlet union having an opening from which fluid flows out of the valve and which is coupled to said valve body, said outlet union including a valve seat:
a cup coupled to said valve body and biased against said valve seat, a first cavity being defined to one side of said cup between said cup and a part of said valve body, a second cavity being defined by said valve seat and said. cup and having a portion on an opposite side of said cup between said cup and a part of said valve seat, said first cavity being in flow communication with said at least one relief channel, said cup being biased against said valve seat preventing fluid in said second and third cavities from flowing out of said outlet union:
an input union coupled to said valve body, a third cavity being defined by said input union and said valve body, said valve body including at least one supply channel between said third cavity and said second cavity; and
a control valve arranged partly inside said valve body, said control valve defining a compartment and including an actuator, a permanent magnet, a first electromagnet on a first side of said permanent magnet and a second electromagnet on a second side of said permanent magnet opposite the first side of said permanent magnet, said drain hole being closer to the second side of said permanent magnet, said first and second electromagnets being configured such that current is provided to said first electromagnet without being provided to said second electromagnet and is provided to said second electromagnet without being provided to said first electromagnet,
said compartment being in flow communication with said at least one relief channel and in flow communication with said third cavity through an additional supply channel,
said actuator being partly arranged in said compartment and, when in a first position, closing said drain hole, permitting flow of fluid from said third cavity through said compartment to said at least one relief channel to said first cavity and preventing fluid flow from said compartment into said drain hole, and when in a second position, being spaced apart from said drain hole permitting flow of fluid from said compartment into said drain hole and obstructing flow of fluid from said third cavity through said compartment to said at least one relief channel and thus to said first cavity.

16. The valve of claim 15, further comprising a control housing coupled to said valve body, said control valve being arranged partly inside said control housing, said second electromagnet being arranged closer to said valve body than said first electromagnet.

17. The valve of claim 15, wherein said actuator comprises:
a slide partly arranged in said compartment and that closes said drain hole when said actuator is in the first position and is spaced apart from said drain hole when said actuator is in the second position;
an armature partly arranged in a space defined by said permanent magnet, said first electromagnet and said second electromagnet; and a rod and buffer unit interposed between said armature and said slide, said armature, said slide and said rod and buffer unit being integral with one another.

18. The valve of claim 15, further comprising attachment means for attaching said control valve, said valve seat and said input union to said valve body, and wherein said armature of said actuator is held in a position by said permanent magnet while said actuator is in the first position, and wherein the valve is configured to move in a direction from a closed position toward an open position by providing current to said first electromagnet and not to said second electromagnet to cause said slide of said actuator to move away from said drain hole, and wherein the valve is configured to move in a direction from the open position toward the closed position by providing current to said second electromagnet and not to said first electromagnet to cause said slide of said actuator to move toward said drain hole.

19. The valve of claim 15, wherein said first and third cavities are configured to have a larger area than an area of a narrowest one of said at least one supply channel.

20. The valve of claim 15, wherein said actuator is elongate and comprises at a first end, a slide that closes said drain hole when said actuator is in the first position and is spaced apart from said drain hole when said actuator is in the second position, an armature arranged at least partly in a space defined by said permanent magnet, said first electromagnet and said second electromagnet at a second end opposite the first end, and a rod and buffer unit interposed between said slide and said armature, and wherein said valve body defines an orifice through which said actuator extends with said slide and said drain hole being on a first side of said orifice and said armature being on an opposite, second side of said orifice, said orifice constituting a barrier to movement of said slide in a direction away from said drain hole, said compartment being in flow communication with said third cavity at a location on the second side of said orifice, said compartment being in flow communication with said at least one relief channel at a location on the first side of said orifice, and wherein said slide is movable against said orifice when said actuator moves to the second position to form an obstruction to flow of fluid from said third cavity through said compartment to said at least one relief channel.

21. The valve of claim 1, wherein the valve has a closed position in which said actuator is held in the first position by said permanent magnet, and wherein the valve has an open position in which current is provided to said first electromagnet and not to said second electromagnet to cause said actuator to move in a direction away from said drain hole toward the second position and permitting fluid flow from said first cavity through said at least one relief channel into said compartment and then into said drain hole causing pressure of the fluid in said second cavity to be greater than pressure of the fluid in said first cavity and resulting in movement of said cup apart from said valve seat and thus flow of fluid from said second cavity through a gap between said cup and said valve seat to said outlet portion, and wherein the valve is configured to move in a direction from the open position to the closed position by providing current to said second electromagnet and not to said first electromagnet to cause said actuator to move toward the first position enabling flow of fluid from said third cavity into said first cavity through said compartment and said at least one relief channel and thus pressure of fluid in said first cavity to become equal to pressure of fluid in said second cavity and thereby result in movement of said cup against said valve seat and prevention of flow of fluid from said second cavity to said outlet portion.

22. The valve of claim 15, wherein the valve has a closed position in which said actuator is held in the first position by said permanent magnet, and wherein the valve has an open position in which current is provided to said first electromagnet and not to said second electromagnet to cause said actuator to move in a direction away from said drain hole toward the second position and permitting fluid flow from said first cavity through said at least one relief channel into said compartment and then into said drain hole causing pressure of the fluid in said second cavity to be greater than pressure of the fluid in said first cavity and resulting in movement of said cup apart from said valve seat and thus flow of fluid from said second cavity through a gap between said cup and said valve seat to said outlet union, and wherein the valve is configured to move in a direction from the open position to the closed position by providing current to said second electromagnet and not to said first electromagnet to cause said actuator to move toward the first position enabling flow of fluid from said third cavity into said first cavity through said compartment and said at least one relief channel and thus pressure of fluid in said first cavity to become equal to pressure of fluid in said second cavity and thereby result in movement of said cup against said valve seat and prevention of flow of fluid from said second cavity to said outlet union.

* * * * *

UNITED STATES PATENT AND TRADEMARK OFFICE
CERTIFICATE OF CORRECTION

PATENT NO. : 10,808,858 B2  
APPLICATION NO. : 16/162658  
DATED : October 20, 2020  
INVENTOR(S) : Victor Kisil Page 1 of 1

It is certified that error appears in the above-identified patent and that said Letters Patent is hereby corrected as shown below:

In the Claims

Claim 15, Column 10, Line 9, change "seat:" to --seat;--;

Claim 15, Column 10, Line 14, change "said. cup" to --said cup--; and

Claim 15, Column 10, Line 20, change "union:" to --union;--.

Signed and Sealed this  
Seventeenth Day of November, 2020

Andrei Iancu  
*Director of the United States Patent and Trademark Office*